(12) United States Patent  
Tsilimantos et al.

(10) Patent No.: US 11,627,358 B2  
(45) Date of Patent: Apr. 11, 2023

(54) COMMUNICATION ENTITY AND A METHOD FOR TRANSMITTING A VIDEO DATA STREAM

(71) Applicants: Huawei Technologies Co., Ltd., Shenzhen (CN); UNIVERSITÉ D'AVIGNON ET DES PAYS DE VAUCLUSE, Avignon (FR); INSTITUT NATIONAL DE RECHERCHE EN INFORMATIQUE ET EN AUTOMATIQUE, Le Chesnay (FR)

(72) Inventors: Dimitrios Tsilimantos, Boulogne Billancourt (FR); Rachid El-Azouzi, Avignon (FR); Albert Sunny, Palakkad (IN)

(73) Assignees: Huawei Technologies Co., Ltd., Shenzhen (CN); UNIVERSITE D'AVIGNON ET DES PAYS DE VAUCLUSE, Avignon (FR); INSTITUT NATIONAL DE RECHERCHE EN INFORMATIQUE ET EN AUTOMATIQUE, Le Chesnay (FR)

( * ) Notice: Subject to any disclaimer, the term of this patent is extended or adjusted under 35 U.S.C. 154(b) by 0 days.

(21) Appl. No.: 17/492,264

(22) Filed: Oct. 1, 2021

(65) Prior Publication Data

US 2022/0021920 A1 Jan. 20, 2022

Related U.S. Application Data

(63) Continuation of application No. PCT/IB2019/000430, filed on Apr. 12, 2019.

(51) Int. Cl.  
*H04N 21/2662* (2011.01)  
*H04L 67/02* (2022.01)  
*H04L 65/75* (2022.01)

(52) U.S. Cl.  
CPC ......... *H04N 21/2662* (2013.01); *H04L 65/75* (2022.05); *H04L 67/02* (2013.01)

(58) Field of Classification Search  
CPC .......... H04N 21/64738; H04N 21/6131; H04L 65/80; H04L 65/61; H04L 65/613  
See application file for complete search history.

(56) References Cited

U.S. PATENT DOCUMENTS 10,819,760 B2 * 10/2020 Wang ...................... H04L 65/80  
2014/0018657 A1    1/2014 Sharma  
(Continued)

FOREIGN PATENT DOCUMENTS

WO    2018121840 A1    7/2018

OTHER PUBLICATIONS

J. Jiang, V. Sekar and H. Zhang, "Improving Fairness, Efficiency, and Stability in HTTP-Based Adaptive Video Streaming With Festive,"in IEEE/ACM Transactions on Networking, vol. 22, No. 1, pp. 326-340, Feb. 2014, doi: 10.1109/TNET.2013.2291681. (Year: 2014).*

(Continued)

*Primary Examiner* — Chirag R Patel  
(74) *Attorney, Agent, or Firm* — Leydig, Voit & Mayer, Ltd.

(57) ABSTRACT

A communication entity for transmitting a video data stream at a target transmission bit rate and corresponding method are provided. The communication entity comprises: a first scheduling instance configured to determine a preliminary transmission bit rate for forwarding the video data stream towards the user equipment; and a second scheduling (Continued)

instance configured to determine the target transmission bit rate based on the preliminary transmission bit rate and a set of video bit rates, the set of video bit rates comprising a first video bit rate associated with a first video quality and a second video bit rate associated with a second video quality, the first video bit rate being smaller than the second video bit rate, wherein the second scheduling instance is configured to select the preliminary transmission bit rate as the target transmission bit rate if the preliminary transmission bit rate does not exceed the first video bit rate.

20 Claims, 8 Drawing Sheets

(56) References Cited

U.S. PATENT DOCUMENTS

| | | | |
|---|---|---|---|
| 2014/0082146 | A1 | 3/2014 | Bao et al. |
| 2015/0156243 | A1 | 6/2015 | Skog et al. |
| 2017/0318602 | A1* | 11/2017 | Wang ............... H04L 65/61 |
| 2019/0058901 | A1 | 2/2019 | Akhtar et al. |
| 2022/0030308 | A1* | 1/2022 | Bentaleb ............ H04L 47/24 |

OTHER PUBLICATIONS

"Information technology—Dynamic adaptive streaming over HTTP (DASH)—Part 1: Media Presentation description and segment formats," International Standard, ISO/IEC 23009-1, total 152 pages (2014).

R. Pantos, Ed. et al., "HTTP Live Streaming, draft-pantos-http-live-streaming-07," IETF, Informational Internet-Draft 2582, total 33 pages (Sep. 2011).

"Cisco Visual Networking Index: Forecast and Trends, 2017-2022," White Paper, total 38 pages, Cisco Public (Feb. 2019).

Sandvine, "Global Internet Phenomena: Latin America and North America," White Paper, total 15 pages (Jun. 2016).

T-Mobile US Binge On, "Content Provider Technical Requirements for Binge On," [Online Feb. 2017] Available: https://www.t-mobile.com/content/dam/tmo/en-g/pdf/BingeOn-Video-Technical-Criteria-March-2016.pdf, total 3 pages.

Colonnese et al., "A Cross-Layer Bandwidth Allocation Scheme for HTTP-Based Video Streaming in LTE Cellular Networks," IEEE Communications Letters, vol. 21, No. 2, pp. 386-389 (Feb. 2017).

Zahran et al., "SAP: Stall-Aware Pacing for Improved DASH Video Experience in Cellular Networks," in Proc. 8th ACM on Multimedia Systems Conference, MMSys'17, New York, NY, USA: ACM, pp. 13-26 (2017).

Cicaló et al., "Improving QoE and Fairness in HTTP Adaptive Streaming Over LTE network," IEEE Transactions on Circuits and Systems for Video Technology, vol. 26, No. 12, pp. 2284-2298 (Dec. 2016).

Chen et al., "A Scheduling Framework for Adaptive Video Delivery over Cellular Networks," in Proc. 19th Annu. Int. Conf. Mobile Computing and Networking, MobiCom'13. New York, NY, USA: ACM, pp. 389-400 (2013).

* cited by examiner

COMMUNICATION ENTITY AND A METHOD FOR TRANSMITTING A VIDEO DATA STREAM

CROSS-REFERENCE TO RELATED APPLICATIONS

This application is a continuation of International Application No. PCT/IB2019/000430, filed on Apr. 12, 2019, the disclosure of which is hereby incorporated by reference in its entirety.

TECHNICAL FIELD

Embodiments of the present disclosure relate to the field of wireless communication. More specifically, embodiments of the present disclosure relate to a communication entity and a corresponding method for transmitting a video data stream towards a user equipment over a communication network.

BACKGROUND

In a typical HTTP Adaptive Streaming (HAS) system, a video file is encoded at different bitrates called representations (i.e. qualities), where each representation is split into segments of similar durations. All segments are stored into a web server and streamed to a client one by one at the quality selected by the client via subsequent HTTP requests. The HAS system does not include specifications on how the bitrate adaptation (quality selection) should be performed, but rather delegates to the client the task of applying its own adaptation strategy.

However, all HAS clients are greedy in the sense that they are designed to get the highest possible Quality of Experience (QoE), i.e., the clients seek to download segments in the highest supported quality under given network conditions.

In the context of mobile networks, where video streaming services are affected by mobility and cell-load variation, the HAS clients continually adapt the streaming quality to cope with throughput variability. Since they operate greedily, adaptive video clients may on one hand overload cellular network resources, degrading the QoE of other network users, and on the other hand they may suffer persistent bitrate oscillations. The root cause of the problem is that each HAS client reacts myopically to variations in throughput generated by the presence of other clients who compete for the same wireless resources.

Thus, the presence of adaptive video streams requires careful resource management in order to take into account such factors and avoid the drawbacks of instability due to unnecessary switching of video bitrate and unfair resource allocation of HAS traffic against other traffic types.

In general, existing approaches to the above identified problems can be cast into one of three kinds: First, the streaming bitrate of HAS clients can be limited to a fixed rate by network operators, which is called "static rate throttling". This forces HAS clients to choose a medium quality in most services, in exchange for some benefits, such as zero rating contracts where the streaming traffic is not added to the monthly data cap of the user. The problem of static rate throttling is that it does not adapt to network load: at low load users do not get high quality and therefore capacity is wasted, while at high load, there is no mechanism to gradually control the HAS traffic.

Secondly, cross-layer allocation schemes profit from application-layer information of streaming, such as the playback buffer occupancy. The information is signaled to the base station scheduler in order to adjust its scheduling results. However, cross-layer signaling has to be adopted by the operators of over-the-top (OTT) services and, so far, all attempts to standardize such signaling interfaces and protocols have failed. Even with such standards in place, the conflicting technical objectives between OTTs and operators make their adoption unlikely. The OTTs aim to maximize QoE for given networks limits while operators aim to maximize network efficiency for a given QoE limit. The OTTs have little or no interest in providing transparency to the lower protocol layers where the schedulers operate.

The third approach relates to "network-assisted bitrate adaptation": Instead of obtaining application-layer information with cross-layer signaling directly, an alternative approach is to estimate key application parameters at the network side (e.g., at a gateway, router or base station). This estimation has accuracy errors and usually relies on Deep Packet Inspection (DPI) techniques. The DPI is computational expensive, technically difficult or impossible to implement with end-to-end encryption/privacy standards and may be restricted by legal constraints, since it enables access to sensitive information that may represent a breach of privacy.

A number of state-of-the-art studies on network optimization for mobile video streaming is discussed in detail in the following:

T-Mobile US, as part of the Binge On program launched in November 2015, uses a static limit of 1.5 Mbit/s for video streaming averaged over one minute of video. This solution provides in most cases a medium quality of 480p and does not provide a way to control quality oscillations, which is not efficient as it cannot adapt to the network load.

In the work "*A cross-layer bandwidth allocation scheme for HTTP-based video streaming in LTE cellular networks*" by S. Colonnese et. al., IEEE Commun. Lett., 2017, the authors proposed a cross-layer bandwidth allocation scheme that takes into account the channel quality as well as the video quality requirements and encoding rate fluctuations of the HAS video stream and minimizes the transmission delays experienced by users. However, this work relies on coordination between OTTs and operators.

In the work "*SAP: Stall-aware pacing for improved dash video experience in cellular networks*" by A. H. Zahran et. al. in Proc. 8th ACM on Multimedia Systems Conference, New York, 2017, the authors leveraged both network and client state information to optimize the pacing of individual video flows in order to reduce video stalls. However, this work assumes that the current video buffer level at the client is known at the scheduler and does not take into account quality oscillations.

In the work "*Improving QoE and fairness in HTTP adaptive streaming over LTE network*" by S. Cical et. al., IEEE Trans. Circuits Syst. Video Technol., 2016, the share of radio resources is optimized according to video content characteristics, playout buffer levels and channel conditions. This work requires Channel State Information (CSI) updates to set up Guaranteed Bit Rates (GBRs). Moreover, it ignores quality changes and requires close coordination between a HAS server, clients and a base station.

In the work "A scheduling framework for adaptive video delivery over cellular networks" by J. Chen et. al. in Proc. 19th Annu. Int. Conf. Mobile Computing and Networking, ser. MobiCom '13. New York, 2013, the authors optimally computed the bitrate allocation for each user and includes a scheduler and per-flow shapers to enforce bitrate stability for each flow. This work provides a gateway-level solution and performs network side bitrate adaptation. However, it is not efficient for dynamic scenarios where it will generate quality switches due to user arrival/departure and mobility.

U.S. Ser. No. 13/789,462 provides an estimation of video buffer occupancy and video stream characteristics (bitrate, buffer delay). This information is then used by the base station scheduler to adjust its scheduling results. However, it relies on access to packet content and metadata information to get the buffer occupancy estimation.

EP2016/082709 proposes a scheduler that assigns resources based on the type of video frames (I, P, B). However, it requires a proxy server to classify each data packet to the video frame type, which is not an easy task with data encryption.

US2014/018657 is based on identifying the bit rate that can maintain a particular video quality of a Dynamic Adaptive Streaming over HTTP (DASH) client. It uses a virtual player to lock the bit rate for a particular time interval; however, it does not take into consideration quality oscillations and it does not provide a way to have efficient and fair utilization of resources among different types of traffic.

In light of the above, there is still a need for an improved communication entity and a corresponding method, allowing for transmitting a video data stream to a user equipment more efficiently.

SUMMARY

It is an object of the disclosure to provide an improved communication entity and a corresponding method for transmitting a video data stream towards a user equipment over a communication network more efficiently.

The foregoing and other objects are achieved by the subject matter of the independent claims. Further implementation forms are apparent from the dependent claims, the description and the figures.

Generally, the present disclosure relates to scheduling of radio resources in mobile networks in the presence of adaptive streaming users. This scheduling is performed in real time by a new instance that cooperates with existing schedulers at a base station. This new mechanism ensures video quality stability for adaptive streaming users, as well as efficient and fair utilization of network resources among all users. The disclosure focuses on the specific traffic type of HTTP Adaptive Streaming (HAS), which is a class of application protocols for the delivery of multimedia data (i.e., video and audio) based on the Hypertext Transfer Protocol (HTTP). Common specifications are Dynamic Adaptive Streaming over HTTP (DASH) and HTTP Live Streaming (HLS).

More specifically, embodiments of the disclosure provide a new scheduling instance (also referred to as "second scheduling instance" hereafter) which is located at the base station and in close collaboration with the existing scheduler of the base station (also referred to as "first scheduling instance" hereafter). The functionality of the second scheduling instance can be summarized as follows:

First, the second scheduling instance receives the instantaneous rate and the average rate of HAS users from the main scheduler, i.e. the first scheduling instance. Secondly, the second scheduling instance retrieves the set of video bitrates for each HAS user, for example by accessing a bitrate database or by querying the set directly from the service provider. It adjusts the output of the first scheduling instance, i.e. the average rate of HAS users, by taking into account the set of available video bitrates. This is achieved by adjusting the rate in order to be equal to the highest video bitrate that is lower than the rate.

Furthermore, the second scheduling instance schedules the HAS users per time slot in order to achieve the target rate by utilizing a fair scheduling policy. The results are sent to the main scheduler (i.e. the first scheduling instance), so that the main scheduler can forward all scheduling results for HAS and non-HAS users to the transmitter of the base station. Also, the second scheduling instance informs the main scheduler about the non-allocated resources, so that they can be used for non-HAS users and thus capacity is not wasted.

Thus, according to a first aspect the disclosure relates to a communication entity for transmitting a video data stream towards a user equipment over a communication network at a target transmission bit rate, wherein the communication entity comprises: a first scheduling instance configured to determine a preliminary transmission bit rate for forwarding the video data stream towards the user equipment; and a second scheduling instance configured to determine the target transmission bit rate upon the basis of the preliminary transmission bit rate and a set of video bit rates, the set of video bit rates comprising a first video bit rate and a second video bit rate, the first video bit rate being associated with a first video quality, the second video bit rate being associated with a second video quality, the first video bit rate being smaller than the second video bit rate, wherein the second scheduling instance is configured to select the preliminary transmission bit rate as the target transmission bit rate if the preliminary transmission bit rate does not exceed the first video bit rate.

Thus, an improved communication entity is provided, allowing for transmitting a video data stream towards a user equipment over a cellular communication network in an efficient manner.

In a further possible implementation form of the first aspect, the second scheduling instance is configured to compare the preliminary transmission bit rate to the second video bit rate if the preliminary transmission bit rate exceeds the first video bit rate, and to select the second video bit rate as the target transmission bit rate if the second video bit rate does not exceed the preliminary transmission bit rate or to select the first video bit rate as the target transmission bit rate if the second video bit rate exceeds the preliminary transmission bit rate.

In a further possible implementation form of the first aspect, the set of video bit rates comprises a plurality of video bit rates being associated with a plurality of video qualities, and wherein the second scheduling instance is configured to determine a maximum video bit rate among those video bit rates from the plurality of video bit rates that are smaller than the preliminary transmission bit rate, or to determine a lowest video bit rate from the plurality of video bit rates that is smaller than the preliminary transmission bit rate, wherein the communication entity is configured to select the respectively determined video bit rate as the target transmission bit rate.

In a further possible implementation form of the first aspect, the communication entity is configured to transmit a further video data stream towards a further user equipment at a further target transmission bit rate, wherein the first scheduling instance is configured to determine a further preliminary transmission bit rate for forwarding the further video data stream towards the further user equipment; and wherein the second scheduling instance is configured to determine the further target transmission bit rate upon the basis of the further preliminary transmission bit rate and the set of video bit rates, wherein the second scheduling instance is configured to select the further preliminary transmission bit rate as the further target transmission bit rate if the further preliminary transmission bit rate does not exceed the first video bit rate. Alternatively, the second scheduling instance is configured to determine the further target transmission bit rate upon the basis of the further preliminary transmission bit rate and a further set of video bit rates, the further set of video bit rates comprising a third video bit rate and a fourth video bit rate, the third video bit rate being associated with a third video quality, the fourth video bit rate being associated with a fourth video quality, the third video bit rate being smaller than the fourth video bit rate, wherein the second scheduling instance is configured to select the further preliminary transmission bit rate as the further target transmission bit rate if the further preliminary transmission bit rate does not exceed the third video bit rate.

In a further possible implementation form of the first aspect, the first scheduling instance is configured to schedule first radio resources of the communications entity for transmission of the video data stream towards the user equipment, and to schedule second radio resources of the communications entity for other data communications.

The other data communications comprise, for instance, communications to non-HAS user equipments and second radio resources are free radio resources which are not allocated for transmission of the video data stream yet.

In a further possible implementation form of the first aspect, the second scheduling instance is configured to receive the preliminary transmission bit rate from the first scheduling instance and to provide the target transmission rate to the first scheduling instance, and wherein the first scheduling instance is configured to schedule radio resources of the communication entity for communication of the video data stream towards the user equipment at the target transmission bit rate, or wherein the second scheduling instance is further configured to schedule radio resources of the communication entity for communication of the video data stream towards the user equipment at the target transmission bit rate and to provide information indicating the scheduled radio resources to the first scheduling instance for communication of the video data stream towards the user equipment at the target transmission bit rate.

In a further possible implementation form of the first aspect, the communication entity comprises a reception interface for receiving, in particular over Internet, the video data stream according to the HTTP adaptive streaming technology.

In a further possible implementation form of the first aspect, the first scheduling instance and the second scheduling instance form a composite scheduler of the communication entity, or wherein the first scheduling instance and the second scheduling instance are separate schedulers implemented in the communication entity.

In a further possible implementation form of the first aspect, the communication entity comprises a data base configured to store the set of video bit rates, or wherein the second scheduling instance is configured to retrieve the set of video data rates from a remote data base over the communication network or over another communication link.

In a further possible implementation form of the first aspect, the first scheduling instance is configured to determine an average transmission bit rate averaging a plurality of transmission bit rates for different video data streams within a time slot, and to determine the preliminary transmission bit rate as the average transmission bit rate.

In a further possible implementation form of the first aspect, the communication entity comprises a transmission interface configured to transmit the video data stream towards the user equipment at the target transmission bit rate.

In a further possible implementation form of the first aspect, the transmission interface is configured to transmit the video data stream towards the user equipment over a radio communication network.

In a further possible implementation form of the first aspect, the communication entity is a base station or an eNodeB.

In a further possible implementation form of the first aspect, the second scheduling instance is configured to determine a best user equipment $i_c^*(t)$ from a plurality of user equipments for allocation of radio resource c of the communication entity at a time slot t by the following equation:

$$\text{for } c \in K$$
$$i_c^*(t) = \begin{cases} \operatorname{argmax}_i(\overline{r}_i(t) - \gamma_i(t))\Gamma_i^c(t), & \text{if } \max_i(\overline{r}_i(t) - \gamma_i(t)) \geq 0 \\ i_v, & \text{otherwise} \end{cases}$$

where K indicates available radio resources, $\overline{r}_i(t)$ indicates a target transmission bit rate for transmission of a video data stream from the communication entity to one of the plurality of user equipments i, $\gamma_i(t)$ indicates a real transmission bit rate for transmission of a video data stream from the communication entity to the respective user equipment i, $\Gamma_i^c(t)$ indicates an instantaneous bit rate for the respective user equipment i at the time slot t for the radio resource c and $i_v$ indicates a user equipment for other data communications with the communication entity, wherein the first scheduling instance is configured to provide the instantaneous bit rate $\Gamma_i^c(t)$ for the respective user equipment i to the second scheduling instance.

According to a second aspect the disclosure relates to a method for transmitting a video data stream towards a user equipment over a communication network at a target transmission bit rate by a communication entity. The method comprises the following steps: determining a preliminary transmission bit rate for forwarding the video data stream towards the user equipment by a first scheduling instance of the communication entity; and determining the target transmission bit rate upon the basis of the preliminary transmission bit rate and a set of video bit rates at a second scheduling instance, wherein the set of video bit rates comprises a first video bit rate and a second video bit rate, the first video bit rate being associated with a first video quality, the second video bit rate being associated with a second video quality, the first video bit rate being smaller than the second video bit rate, wherein the second scheduling instance selects the preliminary transmission bit rate as the target transmission bit rate if the preliminary transmission bit rate does not exceed the first video bit rate.

Thus, an improved method is provided, allowing for transmitting a video data stream from a communication entity towards a user equipment over a communication network in an efficient manner.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of examples, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Generally, the present disclosure relates to a communication entity that works well under dynamic scenarios due to channel and load variation for transmitting a video data stream towards a user equipment over a communication network. The present disclosure focuses on the specific traffic type of HTTP Adaptive Streaming (HAS), which is a class of application protocols for the delivery of multimedia data (i.e., video and audio) based on the Hypertext Transfer Protocol (HTTP). Common specifications are Dynamic Adaptive Streaming over HTTP (DASH) and HTTP Live Streaming (HLS).

Since the majority of multimedia traffic is generated by HAS protocols (see Sandvine, "Global Internet Phenomena: Latin America & North America", *White Paper*, 2016), the large portion of multimedia traffic in the Internet (see Cisco, "Cisco Visual Networking Index: Forecast and Trends, 2017-2022", *White Paper*, 2019) as well as its specific service requirements make it highly desirable to optimize network resource management in the presence of HAS users.

Embodiments of the disclosure provide a fair scheduling instance that is able to arbitrate multiple traffic flows, where HAS flows are controlled in a stable manner. Besides, embodiments of the present disclosure can be combined with any existing scheduling policy implemented at a base station, as well as with any HAS client adaptation policy, facilitating quick and convenient deployments.

As will be described in more detail in the following under reference to FIGS. 1 and 2, embodiments of the disclosure enable a new scheduling instance (also referred to as "second scheduling instance" hereafter and as "ADVISER" in figures) which ensures bitrate stability for the HAS users (also referred to as user equipments hereafter). This scheduling instance is located at the base station and is in close collaboration with the existing scheduler of the base station (also referred to as "first scheduling instance" hereafter).

The second scheduling instance is configured to calculate the scheduling results for HAS user equipments and to communicate them to the first scheduling instance. In order to do this calculation, the second scheduling instance receives information from the first scheduling instance about the transmission bit rates of HAS user equipments (i.e. average and instantaneous transmission bit rates of user equipments), which is information that already exists at the first scheduling instance.

The second scheduling instance is also configured to receive as input a set of video bit rates for each HAS user. This set of video bit rates can be acquired by other methods, for example, by retrieving from a bitrate database that contains a lookup table mapping source Internet Protocol (IP) addresses or Domain Name Servers (DNS) to a given service provider and thus to the known bitrates of this provider, or by querying directly from service providers, assuming that this coordination between the operators and the over-the-top (OTT) service providers is feasible.

The set of video bitrates is used to find a target transmission bit rate for each HAS user equipment. More precisely, this target transmission bit rate is one of the values of the bitrate list, as this ensures bitrate stability. Then, the second scheduling instance calculates the scheduling results of HAS users in order to achieve these target transmission bit rates in a fair way.

Figure 1:
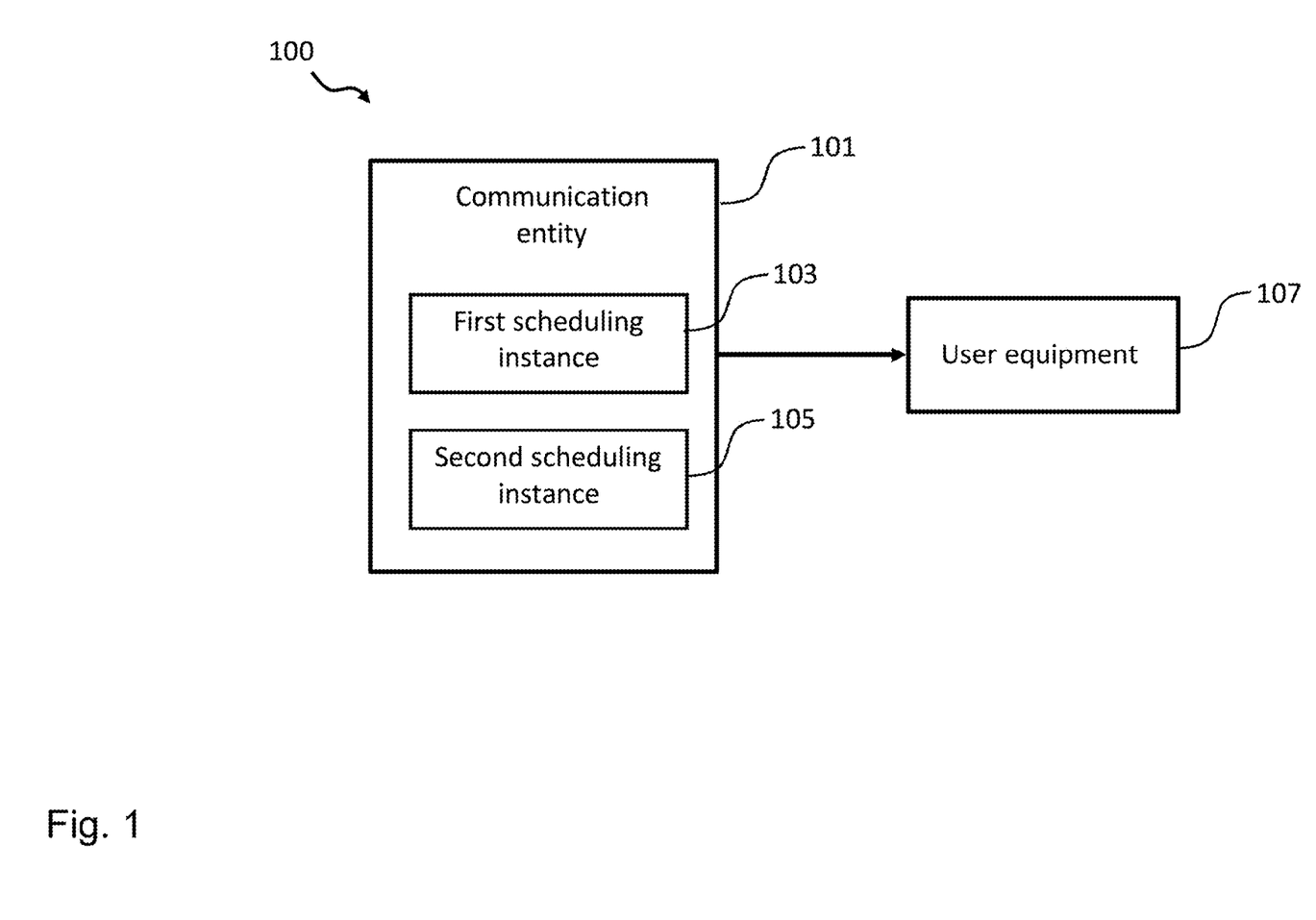
FIG. 1 shows a schematic diagram illustrating a communication system comprising a communication entity according to an embodiment and a user equipment according to an embodiment.

More specifically, FIG. 1 shows a schematic diagram illustrating a communication network 100 comprising a communication entity 101 according to an embodiment and a user equipment 107 according to an embodiment. In an embodiment, the communication entity 101 is a base station or an eNodeB and the communication entity 101 is configured to transmit a video data stream towards the user equipment 107 over the communication network 100.

According to an embodiment, the communication entity 101 comprises a reception interface for receiving, in particular over Internet, the video data stream according to the HTTP adaptive streaming technology as well as a transmission interface configured to transmit the video data stream towards the user equipment 107. In particular, the transmission interface of the communication entity 101 is configured to transmit the video data stream towards the user equipment 107 over a radio communication network.

Figure 2:
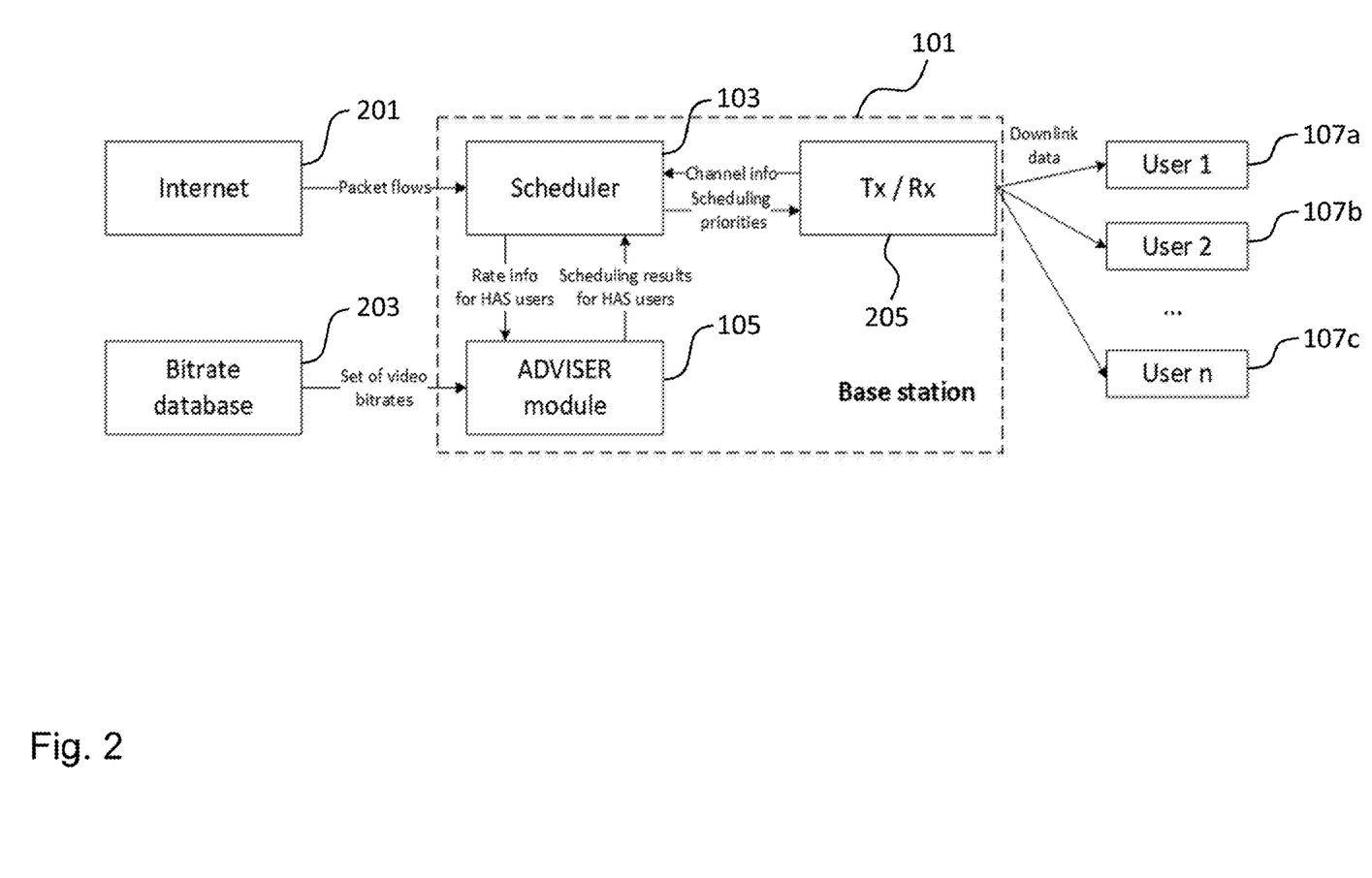
FIG. 2 shows a schematic diagram illustrating a communication system comprising a communication entity according to an embodiment and a plurality of user equipments according to an embodiment.

Similarly, FIG. 2 shows a schematic diagram illustrating a communication network comprising the communication entity 101 according to an embodiment and a plurality of user equipments 107a-c according to an embodiment, wherein the communication entity 101 is configured to transmit a plurality of video data streams towards the plurality of user equipments 107a-c over the communication network.

As can be taken from the detailed view shown in FIGS. 1 and 2, the communication entity 101 comprises a first scheduling instance 103 and a second scheduling instance 105. As shown in the embodiment of FIG. 2, the communication entity 101 further comprises a base station transmitter 205 for data transmission.

In an embodiment, the first scheduling instance 103 and the second scheduling instance 105 form a composite scheduler of the communication entity 101, or the first scheduling instance 103 and the second scheduling instance 105 are separate schedulers implemented in the communication entity 101.

According to an embodiment, the first scheduling instance 103 is configured to determine a preliminary transmission bit rate for forwarding the video data stream towards the user equipment 107, wherein the first scheduling instance 103 is configured to determine the preliminary transmission bit rate as an average transmission bit rate averaging a plurality of transmission bit rates for different video data streams within a time slot.

According to an embodiment, the second scheduling instance 105 is configured to determine the target transmission bit rate upon the basis of the preliminary transmission bit rate and a set of video bit rates, wherein the set of video bit rates comprises a first video bit rate associated with a first video quality and a second video bit rate associated with a second video quality and wherein the first video bit rate being smaller than the second video bit rate.

In an embodiment, the communication entity 101 comprises a data base which is configured to store the set of video bit rates, or the second scheduling instance 105 is configured to retrieve the set of video data rates from a remote data base 203 over the communication network 100 or over another communication link.

To determine the target transmission bit rate, the second scheduling instance 105 is configured to select the preliminary transmission bit rate as the target transmission bit rate if the preliminary transmission bit rate does not exceed the first video bit rate. Further, the second scheduling instance 105 is configured to compare the preliminary transmission bit rate to the second video bit rate if the preliminary transmission bit rate exceeds the first video bit rate, and to select the second video bit rate as the target transmission bit rate if the second video bit rate does not exceed the preliminary transmission bit rate or to select the first video bit rate as the target transmission bit rate if the second video bit rate exceeds the preliminary transmission bit rate.

According to a further embodiment, the set of video bit rates can comprise a plurality of video bit rates being associated with a plurality of video qualities, and the second scheduling instance 105 is configured to determine a maximum video bit rate among those video bit rates from the plurality of video bit rates that are smaller than the preliminary transmission bit rate, or to determine a lowest video bit rate from the plurality of video bit rates that is smaller than the preliminary transmission bit rate. Then, the communication entity 101 is configured to select the respectively determined video bit rate as the target transmission bit rate.

According to a further embodiment, the communication entity 101 can transmit a further video data stream towards a further user equipment 107b at a further target transmission bit rate. The first scheduling instance 103 is configured to determine a further preliminary transmission bit rate for forwarding the further video data stream towards the further user equipment 107b.

Also, the second scheduling instance 105 is configured to determine the further target transmission bit rate upon the basis of the further preliminary transmission bit rate and the set of video bit rates, wherein the second scheduling instance 105 is configured to select the further preliminary transmission bit rate as the further target transmission bit rate if the further preliminary transmission bit rate does not exceed the first video bit rate.

Alternatively, the second scheduling instance 105 is configured to determine the further target transmission bit rate upon the basis of the further preliminary transmission bit rate and a further set of video bit rates, wherein the further set of video bit rates comprises a third video bit rate associated with a third video quality and a fourth video bit rate associated with a fourth video quality and wherein the third video bit rate being smaller than the fourth video bit rate. The second scheduling instance 105 is configured to select the further preliminary transmission bit rate as the further target transmission bit rate if the further preliminary transmission bit rate does not exceed the third video bit rate.

Furthermore, the second scheduling instance 105 is configured to receive the preliminary transmission bit rate from the first scheduling instance and to provide the target transmission rate to the first scheduling instance.

In an embodiment, the first scheduling instance 103 is configured to schedule radio resources of the communication entity 101 for communication of the video data stream towards the user equipment 107 at the target transmission bit rate, or the second scheduling instance 105 is further configured to schedule radio resources of the communication entity 101 for communication of the video data stream towards the user equipment 107 at the target transmission bit rate and to provide information indicating the scheduled radio resources to the first scheduling instance 103 for communication of the video data stream towards the user equipment 107 at the target transmission bit rate.

In a further embodiment, the first scheduling instance 103 is configured to schedule first radio resources of the communications entity 101 for transmission of the video data stream towards the user equipment 107, and to schedule second radio resources of the communications entity 101 for other data communications. The other data communications comprise, for instance, communications to non-HAS user equipments and second radio resources are remaining radio resources which are not allocated yet.

Finally, in an embodiment the second scheduling instance 105 is configured to determine a best user equipment $i_c^*(t)$ from the plurality of user equipments 107a-c for allocation of radio resource c of the communication entity 101 at a time slot t by the following equation:

for $c \in K$ $$i_c^*(t) = \begin{cases} \operatorname{argmax}_i(\bar{r}_i(t) - \gamma_i(t))\Gamma_i^c(t), & \text{if } \max_i(\bar{r}_i(t) - \gamma_i(t)) \geq 0 \\ i_v, & \text{otherwise} \end{cases}$$

where K indicates available radio resources, $\bar{r}_i(t)$ indicates a target transmission bit rate for transmission of a video data stream from the communication entity 101 to one of the plurality of user equipments 107a-c, $\gamma_i(t)$ indicates a real transmission bit rate for transmission of a video data stream from the communication entity to the respective user equipment i, $\Gamma_i^c(t)$ indicates an instantaneous bit rate provided by the first scheduling instance 103 for the respective user equipment i at the time slot t for the radio resource c, and $i_v$ indicates a user equipment for other data communications with the communication entity 101.

In summary, the functionalities of the first scheduling instance 103 and the second scheduling instance 105 are listed as follows:

According to an embodiment, the first scheduling instance 103 can be an existing base station scheduler (e.g. proportional fair) configured to: compute the average transmission bit rate of each HAS user equipment and send it together with his/her instantaneous transmission bit rate to the second scheduling instance 105, wherein the computation of the average transmission bit rate is a standard process of the first scheduling instance 103 for all users and the instantaneous rates are already known at the first scheduling instance 103; get the scheduling results of the HAS users from the second scheduling instance 105, including the scheduling results of the HAS users and the set of used (or equivalently unused) radio resources; schedule the non-HAS users by using the free radio resources and forward the scheduling results for all users (HAS and non-HAS) to the base station transmitter 205 for data transmission.

According to an embodiment, the second scheduling instance 105 is configured to: get the instantaneous transmission bit rate and the average transmission bit rate of HAS users sent from the first scheduling instance 103; retrieve the set of video bitrates (e.g. from the bitrate database 203) for each HAS user; calculate the target transmission bit rate for each HAS user based on his/her average transmission bit rate and the set of video bitrates; schedule the HAS users per time slot according to their instantaneous transmission bit rate and the calculated target transmission bit rate by utilizing a fair scheduling policy; send the scheduling results and the set of used radio resources to the first scheduling instance 103.

The proposed functionalities are applicable to all HAS protocols. As a consequence, the embodiments of the disclosure can schedule HAS traffic for: video on demand (VoD) streaming; live streaming; DASH or HLS specification; TCP or QUIC/UDP; with or without Transport Layer Security (TLS) and Secure Sockets Layer (SSL) encryption.

The embodiments of the disclosure offer the following advantages: no required standardization of cross-layer interfaces, which is of uncertain outcome and adoption; no direct access to the application-layer, avoiding violating user privacy and/or legal boundaries; no modification of existing base station schedulers, facilitating quick deployments; significant reduction of the number of video quality switches, which is an important factor to achieve high Quality of Experience (QoE) for HAS traffic; fair and efficient utilization of radio resources across all network users by controlling the greedy behavior of HAS users; simple design with low computational requirements that can be used in real-time scheduling; no dependencies on specific client side adaptation or requirements for network side HAS adaptation; applicable to both Radio Access Network (RAN) slicing and RAN sharing architectures, as long as the scheduling instances knows which packet flows belong to HAS users.

Furthermore, the embodiments of the disclosure can be readily applied to the following applications: traffic-aware schedulers for network optimization; bandwidth throttling, load control, admission control for traffic shaping.

According to an embodiment, the second scheduling instance 105 receives the values of the average transmission bit rates calculated by the first scheduling instance 103, wherein the average transmission bit rate can be, for instance, computed by existing schedulers for every user i at every time slot t 1 as follows:

$$r_i(t)=(1-\beta)r_i(t-1)+\beta\Sigma_{c\in K}\Gamma_i^c(t)I_{\{\bar{I}_c(t)=i\}},$$

where $\beta$ is the memory of the averaging filter, c is the index of resource block from the set K of available resources, $\Gamma_i^c(t)$ is the instantaneous rate of user i at time slot t at resource c, $I_{\{.\}}$ is the indicator function that is equal to 1 if its argument is true and is equal to 0 otherwise, and $\bar{I}_c(t)$ denotes the user that is virtually allocated resource c at time slot t. It is to be noted that the value of $\bar{I}_c(t)$ is the output of the scheduler's allocation algorithm and that the term virtual is used here in the sense that this allocation is the preliminary allocation for HAS users that can be modified later by the second scheduling instance 105.

Then, the target transmission bit rate $\bar{r}_i(t)$ for each HAS user i at every time slot t is given by:

$$\bar{r}_i(t) = \begin{cases} r_i(t), & \text{if } r_i(t) \leq l_1^i \\ \max\{l_j^i \mid l_j^i \leq r_i(t), 1 \leq j \leq m\}, & \text{otherwise} \end{cases}$$

where $l_j^i$ is the bitrate of video quality with index $j\in\{1, 2, \ldots, m\}$ and $l_{j+1}^i > l_j^i$. The above equation indicates that the target rate is chosen to be equal to the highest video bitrate that is below the provided rate $r_i(t)$ from the first scheduling instance 103.

Figure 3:
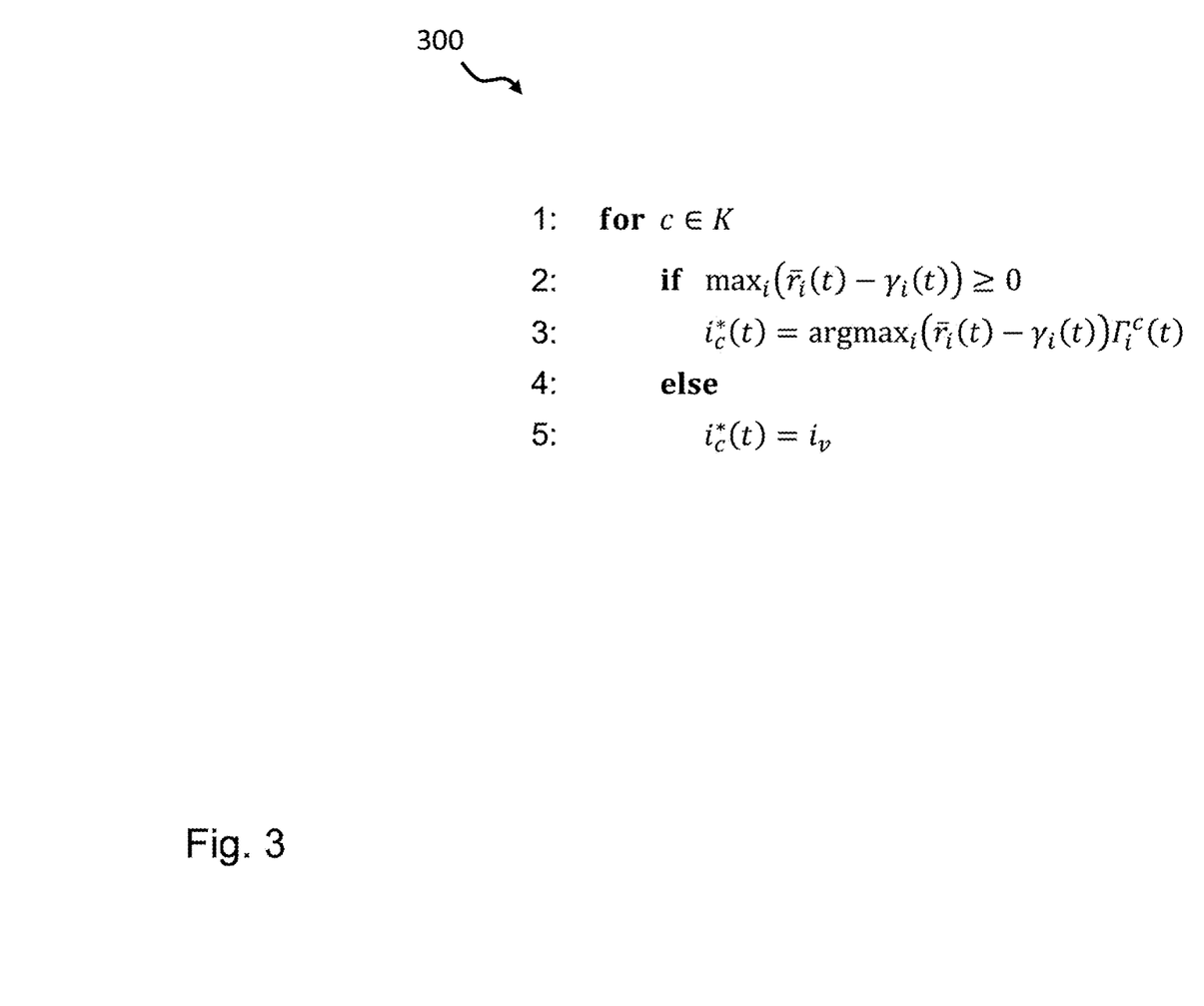
FIG. 3 shows a schematic diagram illustrating an algorithm for radio resource allocation used by a scheduling instance according to an embodiment.

According to another embodiment, once the target rate for each HAS user is calculated, the second scheduling instance 105 is now able to perform the actual resource allocation that can achieve these rates by using the algorithm 300 as shown in FIG. 3.

This algorithm 300 finds the best user $i_c^*(t)$ to allocate resource c at time slot t. The part at line 2 checks if all HAS users have average throughput $\gamma_i(t)$ greater than their target rate $\bar{r}_i(t)$. If this is true, then the resource c is not allocated to a HAS user and thus, is available for non-HAS users, denoted here as a virtual user $i_v$. Otherwise, the resource is allocated in a fair manner to the user with maximum ( $\bar{r}_i(t)-\gamma_i(t))\Gamma_i^c(t)$, i.e. a term that takes into account the instantaneous rate as well as the gap between the target rate and the actual average throughput of the user.

Finally, it should be noted that $\gamma_i(t)$ is calculated in a similar way as the first scheduling instance calculates $r_i(t)$, as shown below:

$$\gamma_i(t)=(1-\beta)\gamma_i(t-1)+\beta\Sigma_{c\in K}\Gamma_i^c(t)I_{\{i_c^*(t)=i\}},$$

where the difference from the equation for $r_i(t)$ is that $i_c^*(t)$ is used instead of $\bar{I}_c(t)$ at the indicator function. This difference leads to an average throughput $\gamma_i(t)$ that is close to the average rate $r_i(t)$, but is modified in a way that its value stabilizes around a video bitrate. In the case of RAN slicing, it is to be noted that only a part of the total resources is available for the HAS users, and thus the summation in the above equation should be performed only over this part of resources.

FIGS. 4 to 7 assess the performance of the embodiments of the disclosure in comparison with that of a proportional fair (PF) scheduler. The performance of the embodiments of the disclosure is studied in a 3GPP-compliant LTE system-level simulator. In order to have a baseline for comparison purposes, the performance of a proportional fair (PF) scheduler is also studied. The key parameters of the simulation setup are listed below: cellular topology with multiple users; mixed traffic with HAS and non-HAS users at the same time;

a set of video bitrates taken from the bitrate values used in a popular platform for video sharing; heavy-tail distribution of the duration of a HAS session with a mean of 240 seconds; random arrivals of users with users leaving the system upon completion of the session; buffer-based HAS adaptation policy.

Figure 4:
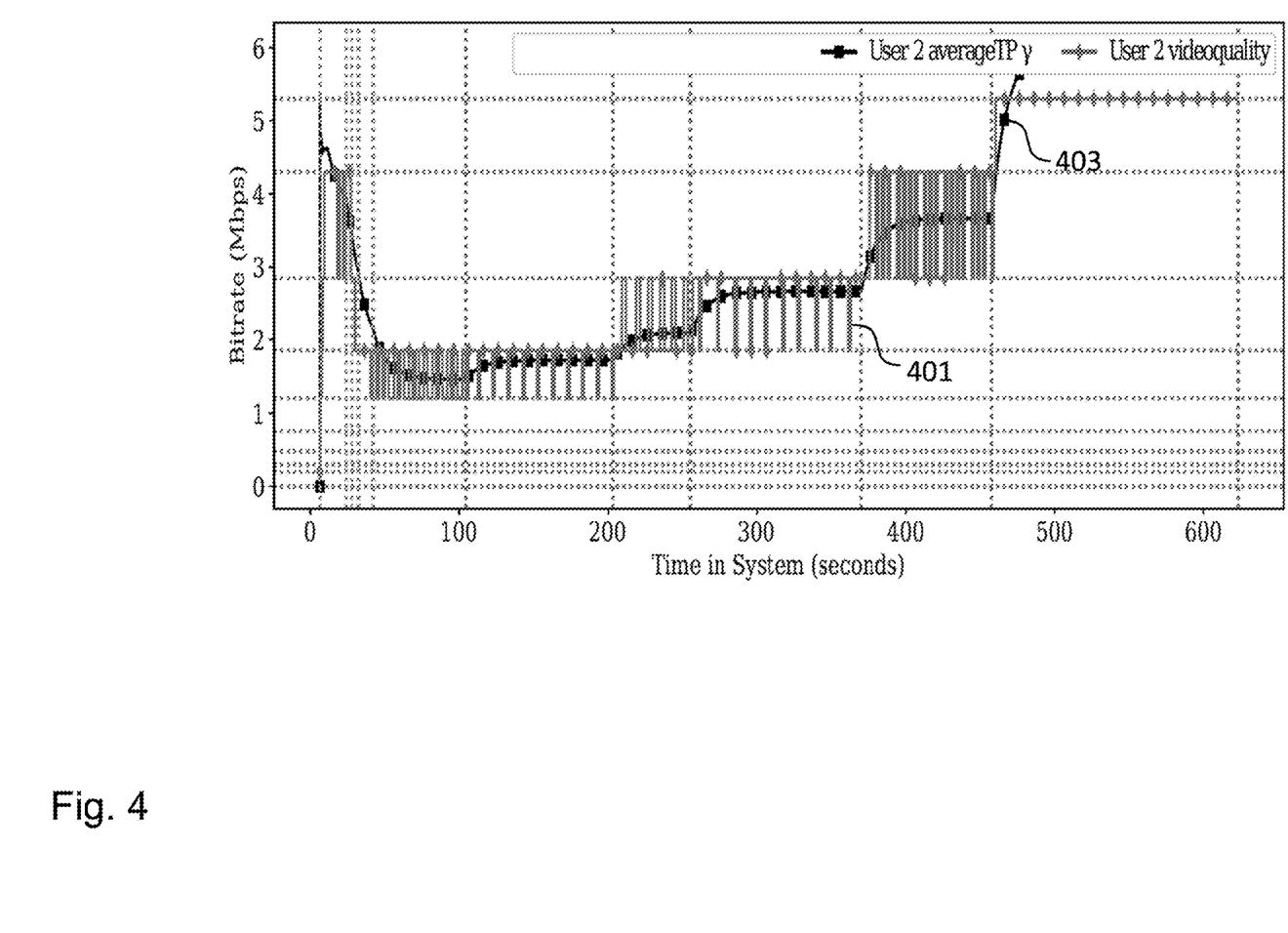
FIG. 4 shows a schematic diagram illustrating video quality dynamics of a typical user over time according to a proportional fair scheduler.

FIG. 4 shows the video quality dynamics over time of a typical user when the proportional fair (PF) scheduler is used. The multiple available HAS bitrate levels are shown as horizontal dotted lines. Moreover, user arrival and departures in the system are represented by the vertical dotted lines. This figure highlights the greedy policy of HAS clients with frequent fluctuations 401 of the video bitrate. Indeed, since the available throughput 403 is almost always between two bitrates, a HAS client alternates between these two qualities and thus, tends to choose often a video bitrate that is not sustainable at the current throughput 403 causing these oscillations 401.

Figure 5:
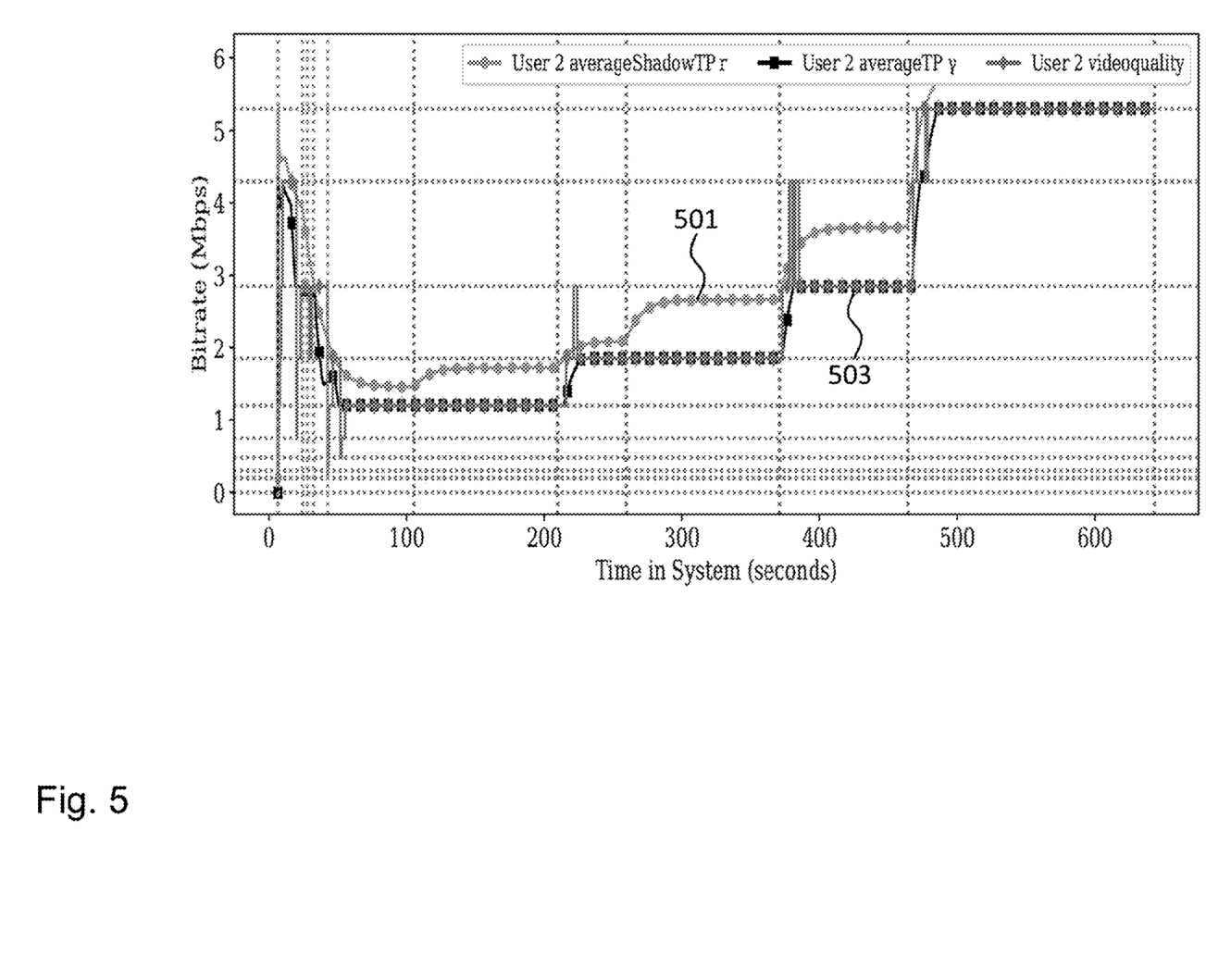
FIG. 5 shows a schematic diagram illustrating video quality dynamics of a typical user over time according to an embodiment.

On the other hand, FIG. 5 shows the video quality dynamics of a typical user according to the embodiments of the disclosure. As seen from FIG. 5, the achieved throughput $\gamma_i(t)$ 501 is set equal to a video bitrate 503, besides short periods of time where a transition happens due to a user arrival or departure. In this way, the buffer level is stabilized and there is a large decrease of quality oscillations.

Figure 6:
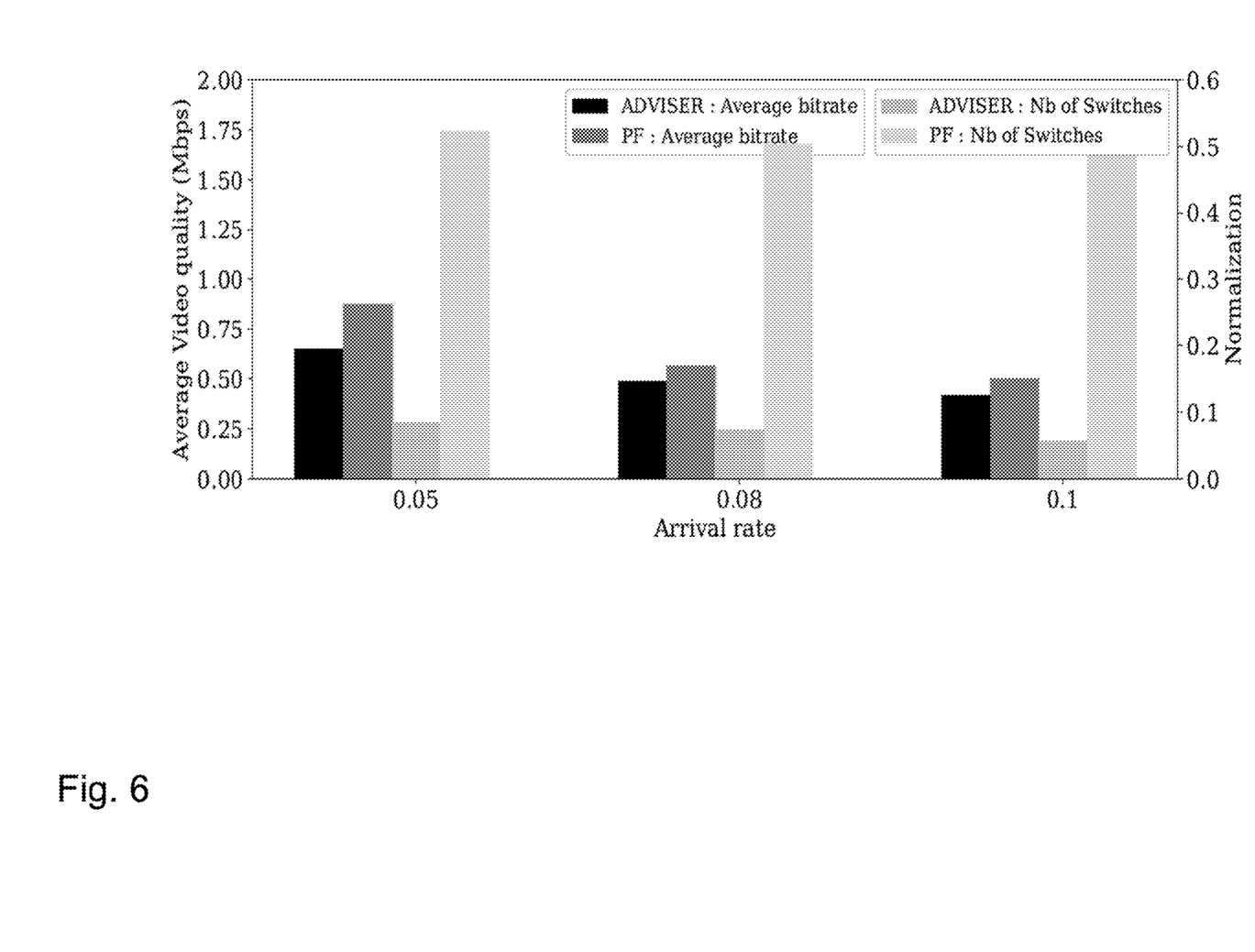
FIG. 6 shows a performance comparison between a scheduling instance according to an embodiment and a proportional fair scheduler for RAN slicing.

FIG. 6 shows a comparison between a scheduling instance (called ADVISER) according to an embodiment and a proportional fair (PF) scheduler in terms of two Quality-of-Experience metrics (i.e. average video quality and number of quality switches) for RAN slicing under an increasing arrival rate of users. Each user takes one of three values of channel rates {3, 6, 9} Mbps with equal probability. The normalized number of switches is measured as the ratio between the number of switches occurred and the total number of segments transmitted. It can be observed that the switching rate is greatly reduced for the ADVISER compared to that for a PF scheduler, i.e., by a percentage ranging from 80.7% to 85.7% overall. The average video quality slightly decreases, but this decrease has a negligible impact on the Quality of Experience (QoE) of the HAS user.

Figure 7:
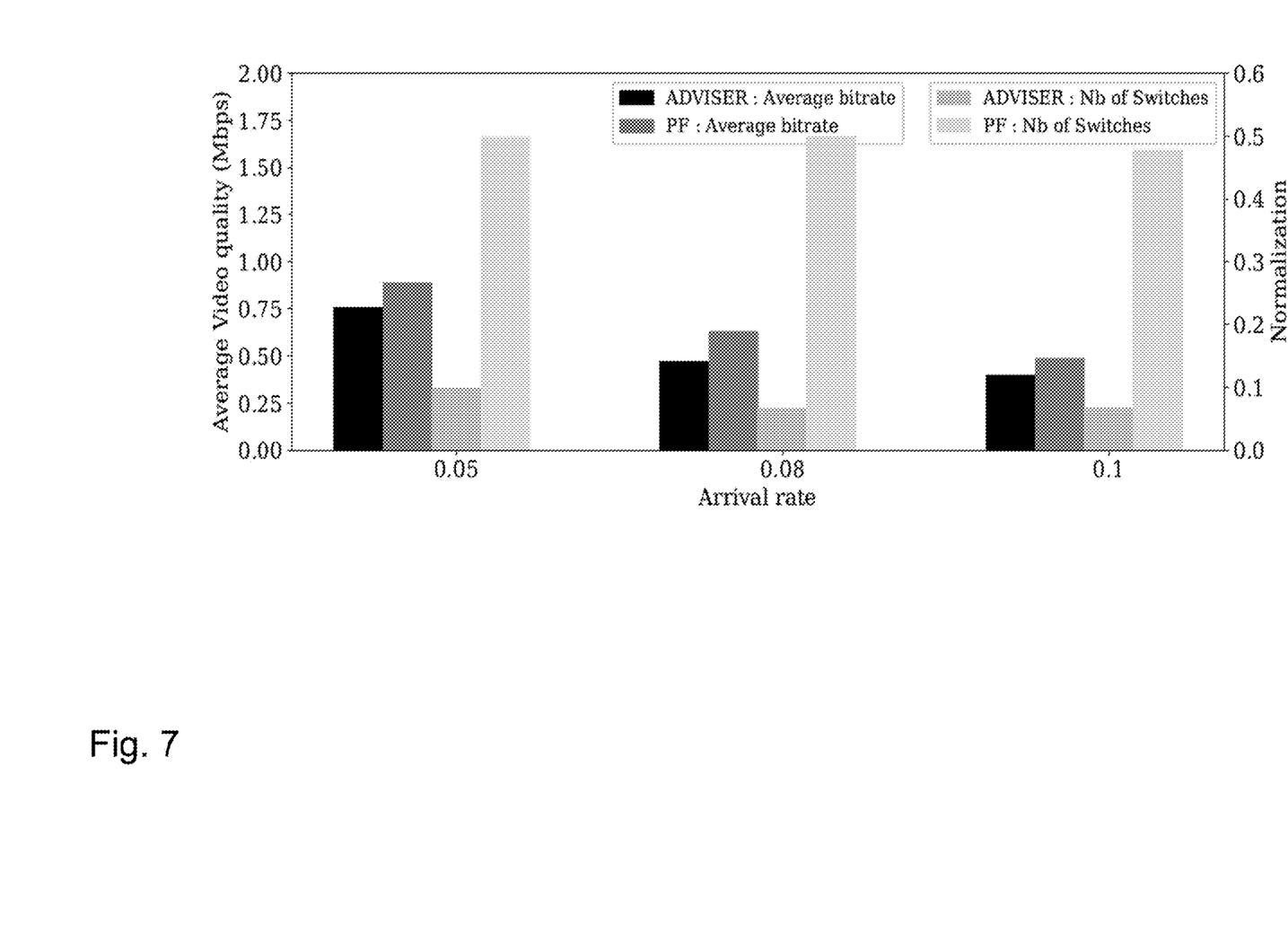
FIG. 7 shows a performance comparison between a scheduling instance according to an embodiment and a proportional fair scheduler for RAN sharing.

FIG. 7 shows a comparison between a scheduling instance (called ADVISER) according to an embodiment and a proportional fair (PF) scheduler in terms of two Quality-of-Experience metrics (i.e. average video quality and number of quality switches) for a RAN sharing scenario where the HAS and non-HAS users have the same pool of bandwidth resources. Here the flow size for non-HAS users is independent and exponentially distributed with a mean of 124 seconds. It can be seen that the performance is similar to the performance in the scenario with RAN slicing as shown in FIG. 6, this time with a decrease in number of quality switches of up to 86.6%.

It is worth noting that, with the simulation setup used for the results shown in FIGS. 6 and 7, there is no video stall occurred for any HAS user, because the average rate of the scheduler was higher than the lowest bitrate. Those scenarios where stalls are likely to happen are also studied and it is verified that the embodiments of the present disclosure do not suffer from increased stalling events compared to a PF scheduler. Overall, the achieved quality of experience for HAS users is higher with the embodiments of the present disclosure.

Figure 8:
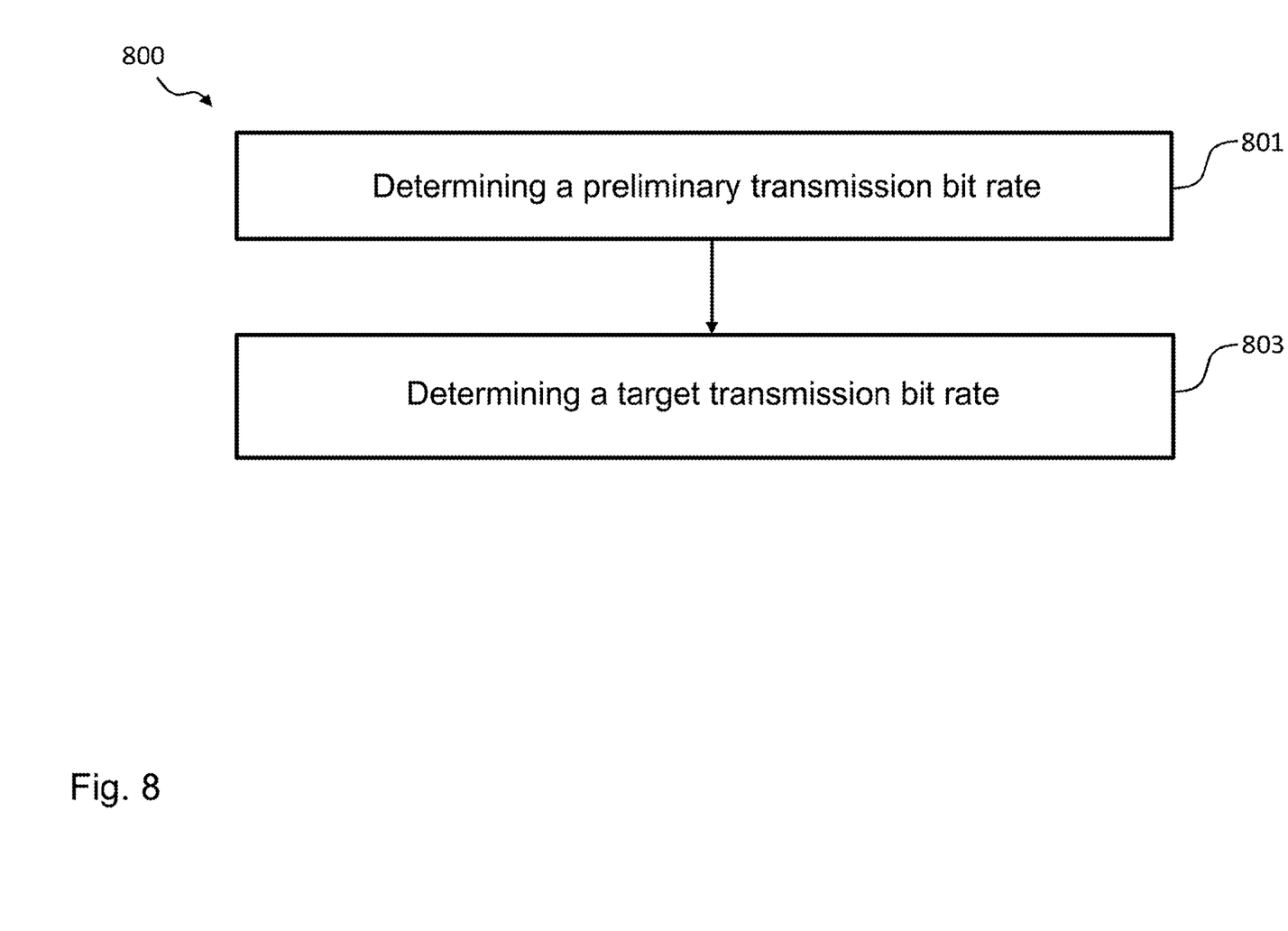
FIG. 8 shows a schematic diagram illustrating a method of transmitting a video data stream towards a user equipment by a communication entity according to an embodiment.

FIG. 8 shows a schematic diagram illustrating a method 800 of transmitting a video data stream towards a user equipment 107 over a communication network at a target transmission bit rate by a communication entity 101.

The method 800 comprises a first step 801 of determining a preliminary transmission bit rate for forwarding the video data stream towards the user equipment 107 by a first scheduling instance 103 of the communication entity 101.

The method 800 comprises a further step 803 of determining the target transmission bit rate upon the basis of the preliminary transmission bit rate and a set of video bit rates at a second scheduling instance 105, wherein the set of video bit rates comprises a first video bit rate and a second video bit rate, the first video bit rate being associated with a first video quality, the second video bit rate being associated with a second video quality, the first video bit rate being smaller than the second video bit rate, wherein the second scheduling instance 105 selects the preliminary transmission bit rate as the target transmission bit rate if the preliminary transmission bit rate does not exceed the first video bit rate.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A communication entity for transmitting a video data stream towards a user equipment over a communication network at a target transmission bit rate, the communication entity comprising:

a memory storing instructions; and a processor coupled to the memory to execute the instructions to:

determine a preliminary transmission bit rate for forwarding the video data stream towards the user equipment;

determine the target transmission bit rate based on the preliminary transmission bit rate and a set of video bit rates, wherein the set of video bit rates comprises a first video bit rate and a second video bit rate, the first video bit rate is associated with a first video quality, the second video bit rate is associated with a second video quality, the first video bit rate is smaller than the second video bit rate, and select the preliminary transmission bit rate as the target transmission bit rate in response to the preliminary transmission bit rate not exceeding the first video bit rate;

determine a further preliminary transmission bit rate for forwarding a further video data stream towards a further user equipment; and determine a further target transmission bit rate based on the further preliminary transmission bit rate and the set of video bit rates; select the further preliminary transmission bit rate as the further target transmission bit rate in response to the further preliminary transmission bit rate not exceeding the first video bit rate; or determine the further target transmission bit rate based on the further preliminary transmission bit rate and a further set of video bit rates, wherein the further set of video bit rates comprises a third video bit rate and a fourth video bit rate, the third video bit rate is associated with a third video quality, the fourth video bit rate is associated with a fourth video quality, the third video bit rate is smaller than the fourth video bit rate; and select the further preliminary transmission bit rate as the further target transmission bit rate in response to the further preliminary transmission bit rate not exceeding the third video bit rate.

2. The communication entity according to claim 1, wherein the processor further executes the instructions to:

compare the preliminary transmission bit rate to the second video bit rate in response to the preliminary transmission bit rate exceeding the first video bit rate, and select the second video bit rate as the target transmission bit rate in response to the second video bit rate not exceed the preliminary transmission bit rate; or select the first video bit rate as the target transmission bit rate in response to the second video bit rate exceeding the preliminary transmission bit rate.

3. The communication entity according to claim 1, wherein the set of video bit rates comprises a plurality of video bit rates associated with a plurality of video qualities, and wherein the processor further executes the instructions to:

determine a maximum video bit rate among those video bit rates from the plurality of video bit rates that are smaller than the preliminary transmission bit rate, or determine a lowest video bit rate from the plurality of video bit rates that is smaller than the preliminary transmission bit rate, and select the respectively determined video bit rate as the target transmission bit rate.

4. The communication entity according to claim 1, wherein the processor further executes the instructions to:

schedule first radio resources of the communication entity for transmission of the video data stream towards the user equipment, and schedule second radio resources of the communication entity for other data communications.

5. The communication entity according to claim 1, wherein the processor further executes the instructions to:

receive the preliminary transmission bit rate from the first scheduling instance and schedule radio resources of the communication entity for communication of the video data stream towards the user equipment at the target transmission bit rate; and provide information indicating the scheduled radio resources for communication of the video data stream towards the user equipment at the target transmission bit rate.

6. The communication entity according to claim 1, further comprising:

a reception interface configured to cooperate with the processor to receive, over Internet, the video data stream according to the HTTP adaptive streaming technology.

7. The communication entity according to claim 1, wherein the communication entity comprises:

a data base configured to store the set of video bit rates, or wherein the processor executes the instructions to: retrieve the set of video data rates from a remote data base over the communication network or over another communication link.

8. The communication entity according to claim 1, wherein the processor executes the instructions to:

determine an average transmission bit rate averaging a plurality of transmission bit rates for different video data streams within a time slot, and determine the preliminary transmission bit rate as the average transmission bit rate.

9. The communication entity according to claim 1, further comprising:

a transmission interface configured to cooperate with the processor to transmit the video data stream towards the user equipment at the target transmission bit rate.

10. The communication entity according to claim 9, wherein the transmission interface is configured to transmit the video data stream towards the user equipment over a radio communication network.

11. The communication entity according to claim 1, wherein the communication entity is a base station or an evolved Node B (eNodeB).

12. The communication entity according to claim 1, wherein the processor executes the instructions to:

determine a best user equipment $i_c^*(t)$ from a plurality of user equipments for allocation of radio resource c of the communication entity at a time slot t by the following:

$$\text{for } c \in K i_c^*(t) = \begin{cases} \operatorname{argmax}_i(\bar{r}_i(t) - \gamma_i(t))\Gamma_i^c(t), & \text{if } \max_i(\bar{r}_i(t) - \gamma_i(t)) \geq 0 \\ i_v, & \text{otherwise} \end{cases}$$

wherein K indicates available radio resources, $\bar{r}_i(t)$ indicates a target transmission bit rate for transmission of a video data stream from the communication entity to one of the plurality of user equipments i, $\gamma_i(t)$ indicates a real transmission bit rate for transmission of a video data stream from the communication entity to the respective user equipment i, $\Gamma_i^c(t)$ indicates an instantaneous bit rate for the respective user equipment i at the time slot t for the radio resource c and $i_v$ indicates a user equipment for other data communications with the communication entity.

13. A transmission method for transmitting a video data stream towards a user equipment over a communication network at a target transmission bit rate by a communication entity, the transmission method comprising:

determining a preliminary transmission bit rate for forwarding the video data stream towards the user equipment by a first scheduling instance of the communication entity;

determining the target transmission bit rate based on the preliminary transmission bit rate and a set of video bit rates at a second scheduling instance, wherein the set of video bit rates comprises a first video bit rate and a second video bit rate, the first video bit rate is associated with a first video quality, the second video bit rate is associated with a second video quality, the first video bit rate is smaller than the second video bit rate, wherein the second scheduling instance selects the preliminary transmission bit rate as the target transmission bit rate in response to the preliminary transmission bit rate not exceeding the first video bit rate;

determining a further preliminary transmission bit rate for forwarding a further video data stream towards a further user equipment; and determining a further target transmission bit rate based on the further preliminary transmission bit rate and the set of video bit rates; select the further preliminary transmission bit rate as the further target transmission bit rate in response to the further preliminary transmission bit rate not exceeding the first video bit rate; or determining the further target transmission bit rate based on the further preliminary transmission bit rate and a further set of video bit rates, wherein the further set of video bit rates comprises a third video bit rate and a fourth video bit rate, the third video bit rate is associated with a third video quality, the fourth video bit rate is associated with a fourth video quality, the third video bit rate is smaller than the fourth video bit rate; and selecting the further preliminary transmission bit rate as the further target transmission bit rate in response to the further preliminary transmission bit rate not exceeding the third video bit rate.

14. The method according to claim 13, further comprising:

comparing, by the second scheduling instance, the preliminary transmission bit rate to the second video bit rate in response to the preliminary transmission bit rate exceeding the first video bit rate, and selecting, by the second scheduling instance, the second video bit rate as the target transmission bit rate in response to the second video bit rate not exceeding the preliminary transmission bit rate or to select the first video bit rate as the target transmission bit rate in response to the second video bit rate exceeding the preliminary transmission bit rate.

15. The method according to claim 13, wherein the set of video bit rates comprises a plurality of video bit rates being associated with a plurality of video qualities, and the method further comprises:

determining, by the second scheduling instance, a maximum video bit rate among those video bit rates from the plurality of video bit rates that are smaller than the preliminary transmission bit rate, or determining, by the second scheduling instance, a lowest video bit rate from the plurality of video bit rates that is smaller than the preliminary transmission bit rate; and selecting, by the communication entity, the respectively determined video bit rate as the target transmission bit rate.

16. The method according to claim 13, further comprising:

scheduling, by the first scheduling instance, first radio resources of the communication entity for transmission of the video data stream towards the user equipment, and scheduling, by the first scheduling instance, second radio resources of the communication entity for other data communications.

17. The method according to claim 13, further comprising:

receiving, by the second scheduling instance, the preliminary transmission bit rate from the first scheduling instance and providing, by the second scheduling instance, the target transmission rate to the first scheduling instance, and scheduling, by the first scheduling instance, radio resources of the communication entity for communication of the video data stream towards the user equipment at the target transmission bit rate, or scheduling, by the second scheduling instance, radio resources of the communication entity for communication of the video data stream towards the user equipment at the target transmission bit rate and to provide information indicating the scheduled radio resources to the first scheduling instance for communication of the video data stream towards the user equipment at the target transmission bit rate.

18. The method according to claim 13, comprising:

determining an average transmission bit rate averaging a plurality of transmission bit rates for different video data streams within a time slot, and determining the preliminary transmission bit rate as the average transmission bit rate.

19. A non-transitory computer-readable medium storing processor executable instructions for implementing a transmission method for transmitting a video data stream towards a user equipment over a communication network at a target transmission bit rate, the instructions, when executed cause a communication entity to:

determine a preliminary transmission bit rate for forwarding the video data stream towards the user equipment;

determine the target transmission bit rate upon the basis of the preliminary transmission bit rate and a set of video bit rates, wherein the set of video bit rates comprises a first video bit rate and a second video bit rate, the first video bit rate is associated with a first video quality, the second video bit rate is associated with a second video quality, the first video bit rate is smaller than the second video bit rate, and select the preliminary transmission bit rate as the target transmission bit rate in response to the preliminary transmission bit rate not exceeding the first video bit rate;

determine a further preliminary transmission bit rate for forwarding a further video data stream towards a further user equipment; and determine a further target transmission bit rate based on the further preliminary transmission bit rate and the set of video bit rates; select the further preliminary transmission bit rate as the further target transmission bit rate in response to the further preliminary transmission bit rate not exceeding the first video bit rate; or determine the further target transmission bit rate based on the further preliminary transmission bit rate and a further set of video bit rates, wherein the further set of video bit rates comprises a third video bit rate and a fourth video bit rate, the third video bit rate is associated with a third video quality, the fourth video bit rate is associated with a fourth video quality, the third video bit rate is smaller than the fourth video bit rate; and select the further preliminary transmission bit rate as the further target transmission bit rate in response to the further preliminary transmission bit rate not exceeding the third video bit rate.

20. The non-transitory computer-readable medium of claim 1, wherein the instructions, when executed, further cause the communication entity to:

determine an average transmission bit rate averaging a plurality of transmission bit rates for different video data streams within a time slot, and determine the preliminary transmission bit rate as the average transmission bit rate.

* * * * *

UNITED STATES PATENT AND TRADEMARK OFFICE
CERTIFICATE OF CORRECTION

PATENT NO. : 11,627,358 B2
APPLICATION NO. : 17/492264
DATED : April 11, 2023
INVENTOR(S) : Tsilimantos et al.

It is certified that error appears in the above-identified patent and that said Letters Patent is hereby corrected as shown below:

On the Title Page

Item (71) Applicants, Left-Hand Column, Lines 5-8: "INSTITUT NATIONAL DE RECHERCHE EN INFORMATIQUE ET EN AUTOMATIQUE, Le Chesnay (FR)" should read -- INSTITUT NATIONAL DE RECHERCHE EN INFORMATIQUE ET EN AUTOMATIQUE, Le Chesnay Cedex (FR) --.

Item (73) Assignees, Left-Hand Column, Lines 5-8: "INSTITUT NATIONAL DE RECHERCHE EN INFORMATIQUE ET EN AUTOMATIQUE, Le Chesnay (FR)" should read -- INSTITUT NATIONAL DE RECHERCHE EN INFORMATIQUE ET EN AUTOMATIQUE, Le Chesnay Cedex (FR) --.

Signed and Sealed this
First Day of August, 2023

Katherine Kelly Vidal
*Director of the United States Patent and Trademark Office*